US006529524B1

(12) United States Patent
Liao et al.

(10) Patent No.: US 6,529,524 B1
(45) Date of Patent: *Mar. 4, 2003

(54) COMPUTER PROGRAM PRODUCTS, METHODS, AND PROTOCOL FOR INTERWORKING SERVICES BETWEEN A PUBLIC TELEPHONE NETWORK, INTELLIGENT NETWORK, AND INTERNET PROTOCOL NETWORK

(75) Inventors: Monling Liao, Raleigh, NC (US); Emad Qaddoura, Plano, TX (US); Rambabu Tummala, Dallas, TX (US); Donald Wurch, Rockwall, TX (US); Liem Le, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,864

(22) Filed: Jul. 23, 1999

Related U.S. Application Data
(60) Provisional application No. 60/115,678, filed on Jan. 13, 1999.

(51) Int. Cl.[7] .................................................. H04J 3/22
(52) U.S. Cl. ........................ 370/467; 709/230; 709/232; 709/236
(58) Field of Search ................................ 709/236, 230, 709/232; 370/466, 467

(56) References Cited

U.S. PATENT DOCUMENTS

| | | | |
|---|---|---|---|
| 5,737,517 A | * 4/1998 | Kite et al. ..................... 714/38 |
| 6,026,086 A | * 2/2000 | Lancelot et al. ............ 370/353 |
| 6,061,364 A | * 5/2000 | Hager et al ................. 370/467 |
| 6,154,467 A | * 11/2000 | Hager et al. ................ 370/467 |
| 6,178,181 B1 | * 1/2001 | Glitho ......................... 370/467 |
| 6,324,183 B1 | * 11/2001 | Miller et al. ................ 370/467 |

FOREIGN PATENT DOCUMENTS

| | | |
|---|---|---|
| EP | 0841831 A | 5/1998 |
| EP | 0915626 A | 5/1999 |
| GB | 2321159 A * | 7/1998 |
| WO | WO 99/29124 A | 6/1999 |

OTHER PUBLICATIONS

Michael McGrew; Transport SS7 Signalling Over IP; Internet Draft; Lucent Technologies; pp. 1–9; Nov. 1998.*

(List continued on next page.)

Primary Examiner—Kenneth R. Coulter
(74) Attorney, Agent, or Firm—Withrow & Terranova, P.L.L.C.

(57) ABSTRACT

Computer program products, related methods, and a protocol for interworking services between a public telephone network, including an Intelligent Network, and an internet protocol network are provided. A public telephone network transports a TCAP message in an SS7 protocol format, and an internet protocol network, or IP network, transports an encapsulated TCAP message in an IP protocol format. A STIPP (Simple TCAP-IP Interworking Protocol) protocol, represented as a computer data signal including a plurality of bits, is used for exchanging TCAP messages between IP network entities. The computer data signal comprises an internet protocol portion, a transport portion, and a STIP (Simple TCAP Interworking Part) portion. The STIP portion includes a STIP header for encapsulating the TCAP message therein for transmission between IP network entities. Various computer data signal embodiments are provided. A computer program product for an interworking gateway exchanging TCAP messages with a public telephone network and encapsulated TCAP messages with an internet protocol network is provided. Further, a computer program product for an IP network entity exchanging encapsulated TCAP messages with an internet protocol network is provided. Message encapsulation, extraction, and decapsulation are provided. Various embodiments and functions are included for each computer program product. A method for exchanging TCAP messages between a public telephone network and an internet protocol network for services interworking is included. Further, a method for exchanging encapsulated TCAP messages with an internet protocol network, such that TCAP messages can ultimately be exchanged with a public telephone network through an internet protocol network is provided.

43 Claims, 7 Drawing Sheets

OTHER PUBLICATIONS

Monling Liao et al.; SS7–TCAP/IP Interworking; Nortel Networks; Internet Draft; IETF; pp. 1–14; Sep. 1999.*

Monling Liao et al.; Simple SS7–TCAP/IP Protocol (STIPP); Nortel Networks; Internet Draft; IETF; pp. 1–17; Mar. 1999.*

Fernando Cuervo et al.; SS7–Internet Interworking; Internet Draft; pp. 1–11; Jul. 1998.*

J. Schmitt et al.; Interaction Approaches for Internet and ATM Quality of Service Architectures; IEEE International Conference on ATM; Jun. 22–24, 1998.*

John Yoakum; IPS7 Open Architecture; Nortel Networks; pp. 1–9; May, 1999.*

L. Ong et al.; Framework Architecture for Signaling Transport; RFC 2719; pp. 1–21; Oct. 1999.*

Hamdi, M. et al., "Voice Service Interworking for PSTN and IP Networks," IEEE Communications Magazine, pp. 104–111, XP–000830888, May 1999.

International Search Report, mailed Nov. 28, 2000.

* cited by examiner

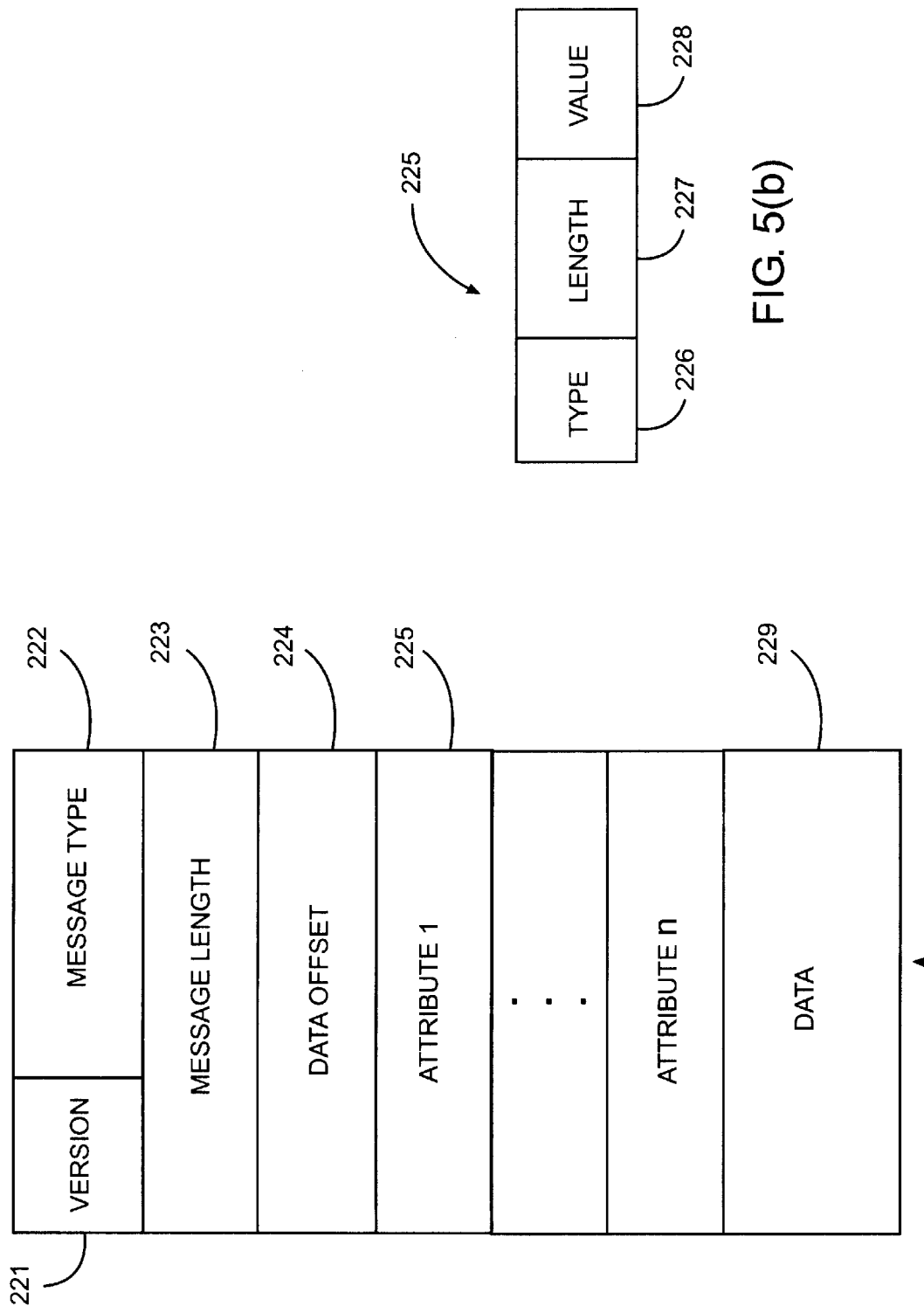

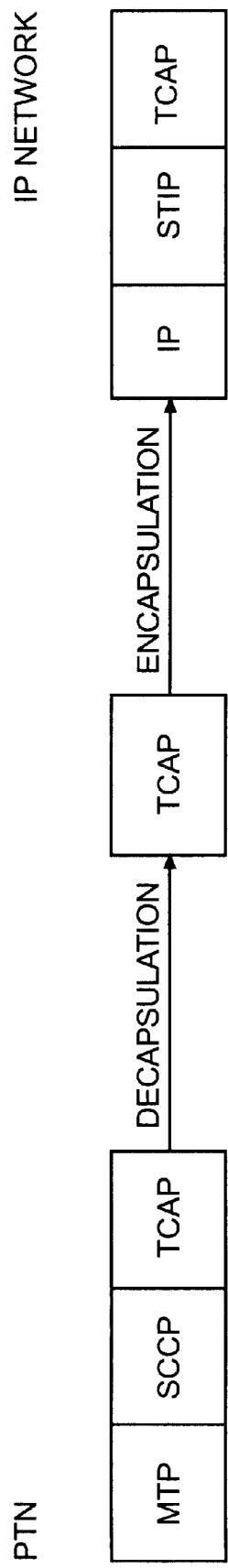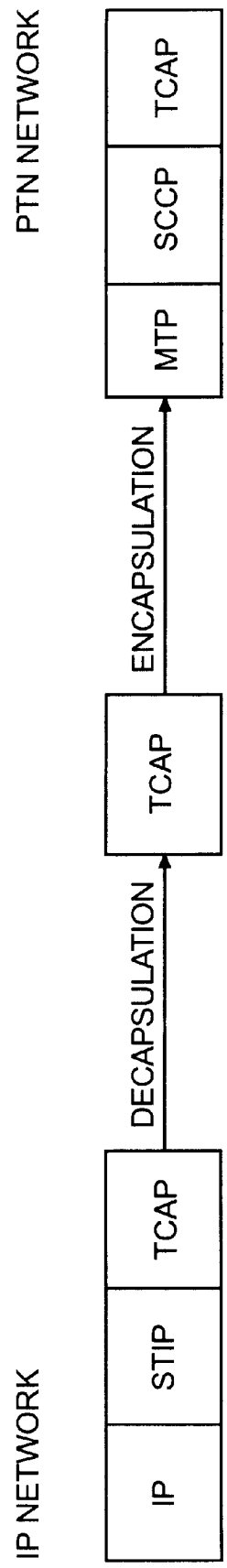
FIG. 6(a)
FIG. 6(b)

COMPUTER PROGRAM PRODUCTS, METHODS, AND PROTOCOL FOR INTERWORKING SERVICES BETWEEN A PUBLIC TELEPHONE NETWORK, INTELLIGENT NETWORK, AND INTERNET PROTOCOL NETWORK

CROSS-REFERENCE TO RELATED APPLICATIONS

This application is related to and claims priority from U.S. Provisional Application No. 60/115,678, filed Jan. 13, 1999, entitled "Methods and Systems for SS7-TCAP Interworking", which is herein incorporated by reference in its entirety.

FIELD OF THE INVENTION

The present invention relates to telecommunications and networking, and more particularly to computer program products, related methods, and a protocol for interworking services between public telephone networks, Intelligent Networks, and internet protocol (IP) networks.

BACKGROUND OF THE INVENTION

Telecommunications originated over a century ago using traditional landline based telephony technology. Over time, standards, protocols, and topologies were developed and optimized to provide telephony services. More recently, wireless telephony was developed as an alternative means of telecommunications. Wireless telephony evolved with its own separate and distinct standards, protocols, and topologies optimized for the mobile telephony environment. The SS7 (Signaling System 7) network was developed to provide digital out-of-band signaling channels for both the landline and wireless telephone networks. The modern public telephone network (PTN) leverages SS7 capabilities to establish telephone call connections and provide advanced services, such as 800 or toll free, calling card, Intelligent Network services, Call Back, Calling Name Delivery, Local Number Portability and wireless roaming services. Further, new architectures and interfaces have been developed recently that permit further integration and cooperation between landline and wireless telephony networks. It has been proven advantageous to share resources and provide PTN services more generically, without being concerned whether the telephone terminals involved in the communication are landline or wireless.

IP networks (including the public Internet) developed in parallel with the converging landline and wireless telephony infrastructures. While the function of the PTN network was primarily to provide end-to-end connections between telephone service subscribers, IP networks were developed to interconnect and leverage the information and processing capabilities of millions of networked computers. Given the substantially more complex purpose of an IP network, it evolved as a separate network infrastructure with distinct protocols optimized for the functions to be provided.

Over time, the functions provided by the PTN network have become increasingly more sophisticated. Therefore, it is not surprising that cooperation between an IP network and a PTN network is desired, and in some instances, required. For example, it would be advantageous to provide services to the PTN network from the vast resources resident on an IP network. In this regard, one early application used the Internet to setup a connection and establish a voice telephone call. An IP telephone call can be originated from any telephone terminal, such as a conventional telephone terminal or an appropriately equipped computer connected to an IP network, and placed to another telephone terminal, such as any other conventional telephone terminal or another appropriately equipped computer connected to an IP network. While this capability is useful, the IP telephone calls are only capable of establishing an end-to-end connection across an IP network. As such, no other services or applications can cross the IP network and PTN network border, although the need for doing so persists.

The IETF (Internet Engineering Task Force) is an open international community of network designers, operators, vendors, and researchers concerned with the evolution of the Internet architecture and the smooth operation of the public Internet. The actual technical work of the IETF is done in its working groups, which are organized by topic into several areas (e.g., routing, transport, security, etc.). Much of the work is handled via email mailing lists and electronic document submissions. Proposals are discussed, evolved, and implemented if advantageous. Proposals have been submitted attempting to converge the capabilities of the IP networks and telecommunication networks. In services interworking for IP telephone calls, one submitted proposal suggests encapsulating the SS7 protocol stack from the link layer to the above layers, including the MTP level 2 and level 3 layers, the SCCP layer, and the TCAP layer. Another proposal suggests encapsulating the SCCP layer and the above layers in the SS7 protocol stack. However, neither proposal properly addresses differences in the addressing and routing functions as implemented in the IP networks and the PTN networks. In addition, neither proposal defines a convergent protocol between these diverse networks. At best, these proposals might ultimately provide transport on an IP network between two PTN networks.

However, in order to effectively converge and leverage these distinct networks, true interworking is required. Interworking refers generally to transporting a message between a first network entity executing a software application program in a first network domain and a second network entity executing a software application program in a second network domain. In other words, interworking refers to exchanging messages between software application programs executing in different network domains. The above proposals fail to provide exchanges of PTN messages, such as TCAP (Transaction Capabilities Application Part) messages, between entities in different networking domains, such as an IP network and the PTN network. Accordingly, a TCAP application executing in an IP network and a TCAP application executing in a PTN network typically cannot exchange TCAP messages, cannot exchange telephony services, and cannot interwork effectively.

As such, a need exists for a fully functional interworking solution between an IP network and the PTN network to preserve the transparency of TCAP messaging in the PTN networks while the TCAP messages are routed to or from IP networks. Further, a need exists for a communication protocol and supporting methods for effectively transporting TCAP messages between a public telephone network and an internet protocol network. Were these needs met, telephony based services could be provided from a public telephone network, an IP network, or both, as desired. A number of other advantages would also likely emerge from providing fully functional interworking between an IP network and a public telephone network, as was observed from the convergence of the landline and wireless network infrastructures.

SUMMARY OF THE INVENTION

The present invention provides a protocol, computer program products, and related methods for supporting services interworking between an IP network and a public telephone network, including the Intelligent Network and wireless networks. As such, the present invention addresses at least some of the above needs while providing some advantages. According to the present invention, conventional TCAP messages from the public telephone network can be exchanged with encapsulated TCAP messages in an IP network. The protocol, computer program products, and related methods of the present invention cooperatively support exchanging encapsulated TCAP messages in the IP network. Computer software application programs executing in network nodes disposed in an IP network and in a public telephone network can thereby cooperatively process information and exchange services therebetween. Existing services can be provided to telephony services subscribers, while new services could be developed by leveraging the processing capability of network nodes in an IP network, according to the present invention.

In one embodiment, the present invention provides a Simple TCAP-IP Interworking protocol (STIPP), represented as a computer data signal embodied in an electrical signal represented as a plurality of bits, for exchanging an encapsulated message between two internet protocol entities. The computer data signal comprises an internet protocol portion, a transport portion, and a STIP (Simple TCAP Interworking Part) portion. The internet protocol portion supports physical layer functions, datalink layer functions, and network layer functions compatible with an internet protocol network. The transport portion is operably connected to the internet protocol portion and serves to support transport layer functions compatible with an internet protocol network. Lastly, the STIP portion is operably connected to the transport portion, and is adapted to exchange the encapsulated message between two internet protocol network entities, such that services interworking is supported therebetween.

Various embodiments of the protocol, or computer data signal, according to the present invention further define the STIP portion. In one embodiment, the STIP portion comprises an STIP header for transporting an encapsulated message therein. Further, the STIP portion may comprise various fields, such as a version field for identifying the version of the STIP portion to at least one internet protocol network entity. In addition, the STIP portion may comprise a message type field, such that the type of message may be identified to at least one internet protocol network entity. The message type field may comprise at least one protocol message type selected from the group consisting of a login message type, a login acknowledgement message type, a security packet message type, and a status message type. In addition, the message type field can comprise at least one data message type selected from the group consisting of a TCAP data message and a TCAP data error message.

The STIP portion can also comprise at least one attribute field, such that information relating to the type of the message may be provided to at least one internet protocol network entity. Further, each attribute field may further comprise a type subfield, so that information relative to the type of attribute may be provided to at least one internet protocol network entity. The type subfield may also comprise one or more parameters selected from the group consisting of a system name, primary/backup system identifier, subsystem number, address mapping option, message encryption index, TIPG status, IP entity status, additional status, protocol type identifier, IP address, calling/ called party address, sequential number identification value, and an error reason. In addition, each attribute field can further comprise a value subfield, such that information relative to the attribute may be provided to at least one internet protocol network entity. Each attribute field may also further comprise a length subfield, so that information relative to the length of the value subfield may be provided to at least one internet protocol network entity. Accordingly, the STIP portion can further comprise a data field, such that an encapsulated data and/or command message may be exchanged between internet protocol network entities. The data field may comprise an encapsulated TCAP message so that encapsulated TCAP messages may be exchanged between internet protocol network entities.

In one embodiment, the present invention further provides a computer program product for an interworking gateway exchanging TCAP messages in an SS7 protocol format with a public telephone network, and exchanging encapsulated TCAP messages in an IP format with an internet protocol network. The computer program product is executable by a processor, and comprises a computer readable storage medium having computer readable program code means embodied therein. The computer readable program code means comprises several computer instruction means. As such, computer instruction means for receiving a TCAP message in the SS7 protocol format from the public telephone network and extracting the TCAP message and associated addressing and routing information therefrom are provided. Further, computer instruction means for converting the associated addressing and routing information for the IP format and encapsulating the TCAP message in the IP protocol format with the converted addressing and routing information are provided. In addition, computer instruction means for transmitting the encapsulated TCAP message with the converted addressing and routing information to the internet protocol network for delivery to an IP network entity therein are also provided.

In an additional embodiment, the computer readable program code of the computer program product further comprises computer instruction means for receiving an encapsulated TCAP message in the IP protocol format from the internet protocol network and extracting the TCAP message and associated addressing and routing information therefrom. Further, computer instruction means for converting the associated addressing and routing information for the SS7 protocol format and encapsulating the TCAP message into the SS7 protocol format with the converted addressing and routing information are provided. In addition, computer instruction means are provided for transmitting the TCAP message with the converted addressing and routing information to the public telephone network for delivery to an SS7 network entity therein.

In a further embodiment, both computer instruction means for converting may further comprise STIP computer instruction means for processing encapsulated TCAP messages with the addressing and routing information in the IP protocol format exchanged with the internet protocol network. The STIP computer instruction means may further comprise computer instruction means for emulating SCCP flow control commands and functions for IP network entities in the internet protocol network represented to the public telephone network. In addition, the STIP computer instruction means may further comprise computer instruction means for decapsulating the TCAP message received in the SS7 protocol format from the public telephone network and encapsulating the TCAP message the IP protocol format for transmission to the internet protocol network. The STIP computer instruction means may further comprise computer instruction means for decapsulating the TCAP message received in the IP protocol format from the internet protocol network and encapsulating the TCAP message the SS7 protocol format for transmission to the public telephone network.

Further, the STIP computer instruction means may further comprise computer instruction means for interacting with the IP network entity and the internet protocol network through a STIPP protocol stack in the IP protocol format. In addition, the STIP computer instruction means may further comprise computer instruction means for performing address mapping and translation, such that the IP network entity can be addressed by a point code and subsystem number to the public telephone network and by an IP address and a port number to the internet protocol network. Still further, the STIP computer instruction means may further comprise computer instruction means for performing extended global title translations, such that a destination node in the public telephone network can be identified by at least one of a point code and optionally a subsystem number of an application entity within the destination node, and such that a destination node in the internet protocol network may be identified by an IP address and a port number. The STIP computer instruction means may further comprise computer instruction means for performing protocol discrimination for the TCAP message received from the public telephone network, so that the TCAP standard, the upper layer messaging protocol, or both, associated with the TCAP message can be identified. In addition, the STIP computer instruction means may further comprise computer instruction means for providing security functions, such as CHAP (Challenge Handshake Authentication Protocol) security functions, for authenticating the IP network entity before TCAP messages are exchanged with the IP network entity. Lastly, the STIP computer instruction means may further comprise computer instruction means for performing mediation functions to ensure that information is accessed and modified only by an authorized IP network entity or public telephone network entity.

In one embodiment, the present invention further provides a computer program product for an IP network entity exchanging encapsulated TCAP messages in an IP protocol format with an internet protocol network. The computer program product is executable by a processor, and comprises a computer readable storage medium having computer readable program code means embodied therein. The computer readable program code means comprises several computer instruction means. As such, computer instruction means for receiving a TCAP message encapsulated in the IP protocol format from the internet protocol network are provided, wherein the TCAP message originated in the public telephone network. In addition, computer instruction means for extracting the TCAP message and the associated addressing and routing information from the encapsulated TCAP message received are provided. Further, computer instruction means for processing the TCAP message originating in the public telephone network and received by the IP network entity are provided. The computer readable program code may further comprise computer instruction means for encapsulating a TCAP message in the IP protocol format for the internet protocol network, wherein the TCAP message originated in the IP network entity. The computer readable program code may also comprise computer instruction means for transmitting the TCAP message through the internet protocol network to an SS7 network entity in the public telephone network.

In a further embodiment, the computer program product may further comprise STIP computer instruction means for encapsulating and decapsulating TCAP messages with the addressing and routing information in the IP protocol format exchanged with the internet protocol network. In addition, the STIP computer instruction means may further comprise computer instruction means for interacting with the internet protocol network through a STIPP protocol stack in the IP protocol format. Further, the computer instruction means for processing the TCAP message received may further comprise computer instruction means for analyzing the TCAP message received to determine whether data incorporated therein can be processed by the IP network entity, and whether or not a data error message should be returned to the originator of the TCAP message in the public telephone network. The STIP computer instruction means can further comprise computer instruction means for providing security functions, such as CHAP security functions, to authenticate the IP network entity before TCAP messages are exchanged with the IP network entity. In addition, the STIP computer instruction means can further comprise computer instruction means for functions of the same three SCCP primitives as provided by the SS7 network to a TCAP application within the IP entity to send and receive TCAP messages.

One embodiment of the present invention provides a method for exchanging TCAP messages between a public telephone network and an internet protocol network for providing services interworking. The method according to one embodiment comprises the step of receiving a TCAP message and associated addressing and routing information in an SS7 protocol format from the public telephone network. Further, the method includes the steps of extracting the TCAP message and associated addressing and routing information from the TCAP message received, and converting the associated addressing and routing information for an IP protocol format and encapsulating the TCAP message in the IP protocol format with the converted addressing and routing information. In addition, the method comprises the step of transmitting the encapsulated TCAP message with the converted addressing and routing information to the internet protocol network for delivery to an IP network entity therein.

In another embodiment, the method may further comprise the step of receiving an encapsulated TCAP message in the IP protocol format from the internet protocol network and extracting the TCAP message and associated addressing and routing information therefrom. The method may further comprise the step of converting the associated addressing and routing information for the SS7 protocol format and encapsulating the TCAP message into the SS7 protocol format with the converted addressing and routing information. Further, the method can further comprise the step of transmitting the TCAP message with the converted addressing and routing information to the public telephone network for delivery to an SS7 network entity therein, after the transmitting step.

For one embodiment of the method, the converting and encapsulating for the IP protocol step may comprise extracting the TCAP message from the SS7 protocol format and encapsulating the TCAP message in a STIP protocol header in the IP protocol format, and the converting and encapsulating for the SS7 protocol step can comprise extracting the TCAP message from the STIP protocol header in the IP protocol format and encapsulating the TCAP message in the SS7 protocol format. In another embodiment of the method, both converting steps further comprise the step of performing at least one translation selected from the group consisting of an address translation and a global title translation on the respective TCAP message received.

In one embodiment, the present invention further provides a method for exchanging encapsulated TCAP messages with an internet protocol network, such that TCAP messages can therethrough be exchanged with a public telephone network. The method comprises the step of receiving a TCAP message encapsulated in an IP protocol format from the internet protocol network, wherein the TCAP message originated in the public telephone network. The method comprises the step of extracting the TCAP message and the associated addressing and routing information from the encapsulated TCAP message received. In addition, the method comprises the step of processing the TCAP message originating in the public telephone network and received by the IP network entity. A further embodiment of the method further comprises the steps of encapsulating a TCAP message in the IP protocol format from the internet protocol network, wherein the TCAP message originated in IP network entity, and transmitting the TCAP message through the internet protocol network to an SS7 network entity in the public telephone network. In addition, the method may further comprise the step of interacting with the internet protocol network through a STIPP protocol stack in the IP protocol format.

As such, the aforementioned protocol, computer program products, and related methods support fully functional services interworking between an IP network and a public telephone network by exchanging TCAP messages in respectively compatible formats. TCAP messages can be transported across network domains, and processed by compatible software application programs in an internet protocol network and in a public telephone network such that true services interworking can be achieved.

BRIEF DESCRIPTION OF THE FIGURES

FIGS. 5(a) and 5(b) are block diagrams of a STIP portion and of attribute subfields within a STIP portion of a protocol for transporting messages between IP network nodes respectively, according to one embodiment of the present invention.

FIGS. 6(a) and 6(b) are diagrams illustrating TCAP message processing operations supported by an interworking gateway computer program product between a PTN network and an IP network and between an IP network and a PTN network respectively, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Although specific terms are employed herein, they are used in a generic and descriptive sense only and not for purposes of limiting the scope of the present invention in any way. Further, although portions of the specification are divided by headings for purposes of clarity and readability, the specification in its entirety should be used for interpreting the present invention.

Figure 1A:
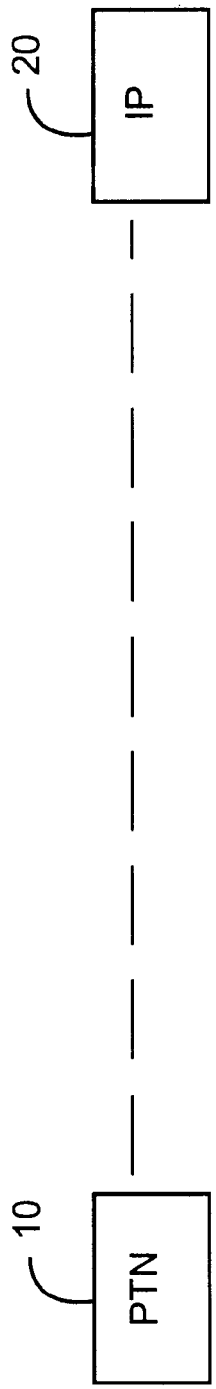
FIGS. 1(a) and 1(b) are block diagrams comparing the interface between the public telephone network and an IP network, prior to the present invention and according to one embodiment of the present invention, respectively.

As described above, public telephone networks developed significantly earlier than internet protocol (IP) networks. The two separate and distinct network infrastructures evolved independently, as shown in FIG. 1(a). For some time, there was no gateway functionality to interconnect an IP network 20 and a public telephone network (PTN) 10. Eventually, the capability to establish a telephone call from an IP telephone terminal to a telephone terminal in the public telephone network was developed. This is shown by the dashed line between PTN 10 and IP network 20. However, this capability only establishes an end-to-end connection between the respective networks, and as such, is of limited usefulness.

Figure 1B:
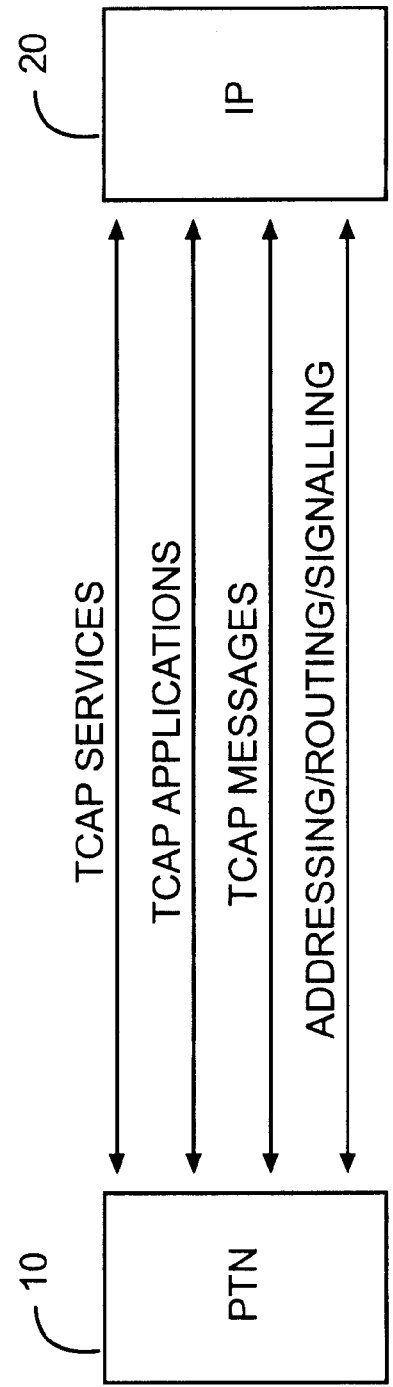

The present invention supports fully functional advanced services interworking between a public telephone network and an IP network, as shown in FIG. 1(b), by providing a protocol, computer program products, and related methods for exchanging messages between both networks. The differing messaging formats, addressing, and routing found in an IP network and public telephone network are reconciled and managed seamlessly. Accordingly, TCAP messages are transported between network domains through the protocol, computer program products, and related methods. The present invention permits TCAP software application programs operating in the public telephone network and IP network to exchange and process TCAP messages. TCAP based services can therefore be exchanged between the IP network and public telephone network. Thus, advanced telephony services can be provided by the public telephone network, the IP network, or both. Interworking divergent IP networks and public telephone networks creates a cooperative processing environment for leveraging the capabilities of each respective network. For example, telephony services could be provided from the PTN network, an IP network, or both. Accordingly, a protocol, computer program products, and related methods provided by the present invention support true and fully functional services interworking between a public telephone network and an internet protocol network.

Terminology

Discussion regarding the present invention will be facilitated by establishing the meaning of terminology to be used herein. Other terminology not expressly defined herein should be interpreted as the term is normally used by those skilled in the art.

Challenge Handshake Authentication Protocol (CHAP)

A security protocol defined by IETF RFC 1994 for handshaking functions between two IP network entities.

Directory Number (DN)

Telephone number or subscriber number associated with a telephone terminal.

Global Title Translation (GTT)

An SS7 routing function that translates a logical address to a physical SS7 address and possibly, a subsystem number, which identifies the application that will process the message whose address is being translated.

IP network (or internet protocol network)

Any network operating with the IP protocol, such as corporate intranets, local area subnetworks, other IP networks, or the public Internet network.

Internet network (i.e. the public Internet network)

A worldwide network of backbone interconnected computer networks, each including uniquely addressable, interconnected computers.

Internet Protocol (IP)

A well-known worldwide standard messaging format or protocol used in the public Internet network and other internet protocol (IP) networks comprising network layer functions in the OSI model protocol stack. Frequently referred to herein as the IP protocol.

Internet Service Provider (ISP)

A provider of access to the public Internet and/or to services on an internet protocol network.

Message Transfer Part (MTP)

The lower three layers in the SS7 protocol, which provide physical, data link, and network functions. The network layer functions provide message routing between signaling points in the SS7 network. MTP provides functionality generally defined by the lower three layers in the OSI model protocol stack.

Public Telephone Network—(PTN)

A public circuit switched telephone network, including landline, wireless, or both types of telephone network infrastructures. The PTN may include local telephone network components, long distance telephone network components, or both owned by a PTN service provider or carrier.

Signaling Connection Control Part (SCCP)

The signaling layer in the SS7 protocol that provides a transfer capability for circuit related and non-circuit related signaling information.

Signaling System 7 (SS7)

A worldwide standard messaging format which defines the procedures and protocol used by network entities in the PTN network to exchange information over a digital out-of-band signaling network in order to setup, route, and control telephone calls and provide routing capabilities for wireless, Intelligent Network and other advanced services.

Signaling Transfer Point (STP)

A node or network entity in the SS7 network that serves as a packet switch and routes incoming messages based on routing information contained in an SS7 message. An STP may perform Global Title Translation.

Signaling Point (SP)

A network node in the SS7 network. It may be a signaling endpoint, signaling transfer point (STP), service switching point (SSP) or a service control point (SCP).

Simple TCAP Interworking Part (STIP)

A convergence protocol layer provided between the TCAP layer and the transport layer (e.g. TCP or UDP) in IP network, such that TCAP messages can be transported over the IP protocol layer in an IP network.

Simple TCAP-IP Interworking Protocol (STIPP)

A protocol between an interworking gateway and an IP entity for providing TCAP/IP interworking between PTN and IP networks.

Subscriber

A customer who subscribes to telephony based services.

TCAP/IP Interworking Gateway (TIPG)

The network entity that provides a fully functional interface for exchanging TCAP messages between a PTN/SS7 network and an IP network, to support fully functional interworking therebetween.

Transaction Capabilities Application Part (TCAP)

Transaction Capabilities in the SS7 protocol are functions that control non-circuit related information transfer between two or more signaling nodes executing applications via a signaling network. Queries and responses between SSPs and SCPs are carried in TCAP messages. In the SS7 protocol, TCAP uses SCCP routing and addressing functions to send and receive messaging data.

Transmission Control Protocol (TCP)

A worldwide standard messaging format or protocol used in an IP network comprising transport layer functions in the OSI model protocol stack.

Simple TCAP/IP Interworking Protocol and Stack

Figure 2:
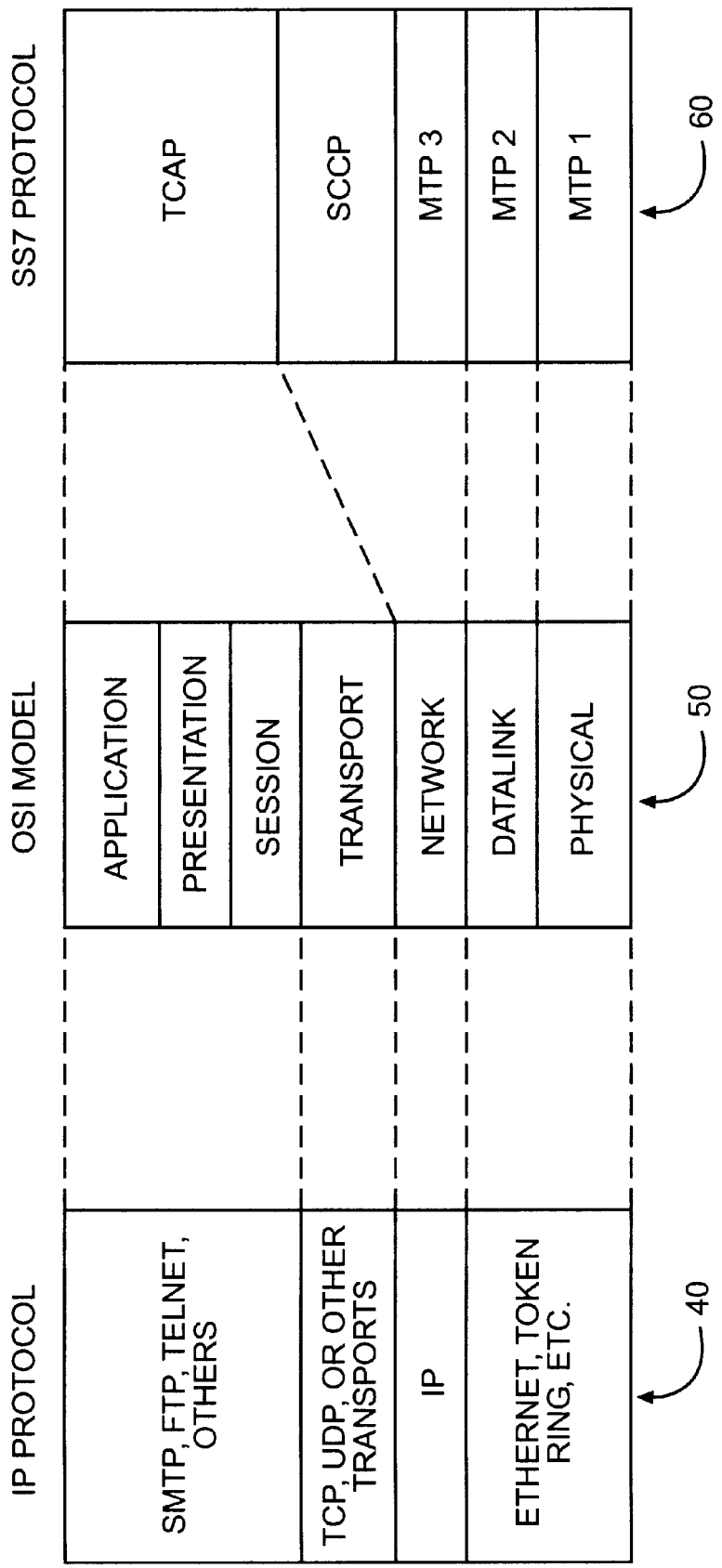
FIG. 2 is a diagram illustrating the varying messaging formats used in an IP network, in the OSI model, and in a public telephone network, respectively.

The problems solved and advantages provided by the present invention can be better understood by analyzing the incompatibility inherent in transporting messages between a public telephone network and an internet protocol network. As such, the divergent and formerly incompatible messaging protocol formats used in a public telephone network, such as a PTN/SS7 network, and in an internet protocol network, such as the Internet are illustrated in FIG. 2. Protocol layer mappings shown in FIG. 2 are approximate because of the disparity between the various protocol formats. As shown, the IP network uses an IP protocol format that is substantially different from the SS7 protocol format used in the public telephone network. The IP messaging format or "protocol stack", OSI model protocol stack, and SS7 protocol stack are all illustrated for purposes of comparison. The OSI model defines an OSI protocol stack 50 that comprises seven layers, each denoted according to the function provided by each layer. For instance, the data link layer conveys messages along a local data link, while the network layer conveys messages along a network. The OSI model is used as a reference protocol stack at the center of FIG. 2, while the IP and SS7 protocol stacks are disposed on either side of the OSI model protocol stack. Dashed lines are drawn to show the rough correspondence between the functions in the OSI model layers and the corresponding functional layers in the IP and SS7 protocols. For the IP protocol stack 40, the lower two layers are implemented as Ethernet, Token Ring, or some other data link, as shown. The IP (internet protocol) layer comprises the network layer for the IP protocol stack. In contrast, for the SS7 protocol stack 60, the MTP level 3 layer and SCCP layer perform the comparable OSI network layer functions. TCP, UDP, or another transport-like layer performs the transport functions for the IP protocol stack. IP resources such as SMTP, Telnet, etc. perform application layer functions, while some resources also perform at least some part of the presentation layer functions. In contrast, the TCAP layer in the SS7 protocol stack performs application layer functions as well as other functions. Given the differences in the distribution of protocol functions between the IP protocol layers and the SS7 protocol layers, it is apparent that significant message format transformations are required in order to provide fully functional interworking between an IP network and PTN/SS7 network.

The present invention provides a protocol, computer program products, and related methods for supporting full services interworking between an IP network and a public telephone network. Preferably, the computer program product is executed within an interworking gateway or comparable device, such as the example TIPG (TCAP/IP Interworking Gateway) 100 shown in FIG. 3, which serves to exchange TCAP messages between the IP network and the public telephone network. TCAP messages are transported in the SS7 protocol format 201 through the public telephone network in a conventional manner. For example, a TCAP message portion 200 can be transported through the PTN network in the SS7 protocol format through the established SS7 protocol stack 201 as shown. The present invention provides a protocol stack 202 for encapsulating the TCAP message 200 in the IP protocol format such that the TCAP message can be transported between IP network nodes, such as between a TIPG gateway or comparable device and other IP network entities or servers, in an internet protocol network. The computer program product in the TIPG gateway can receive, translate, and forward TCAP messages in either protocol format, such that TCAP messages can be exchanged across network boundaries. Accordingly, the protocol provided by the present invention serves as a vehicle for transporting the TCAP message through the internet protocol network, without altering the characteristics of the TCAP message exchanged therebetween.

Figure 4:
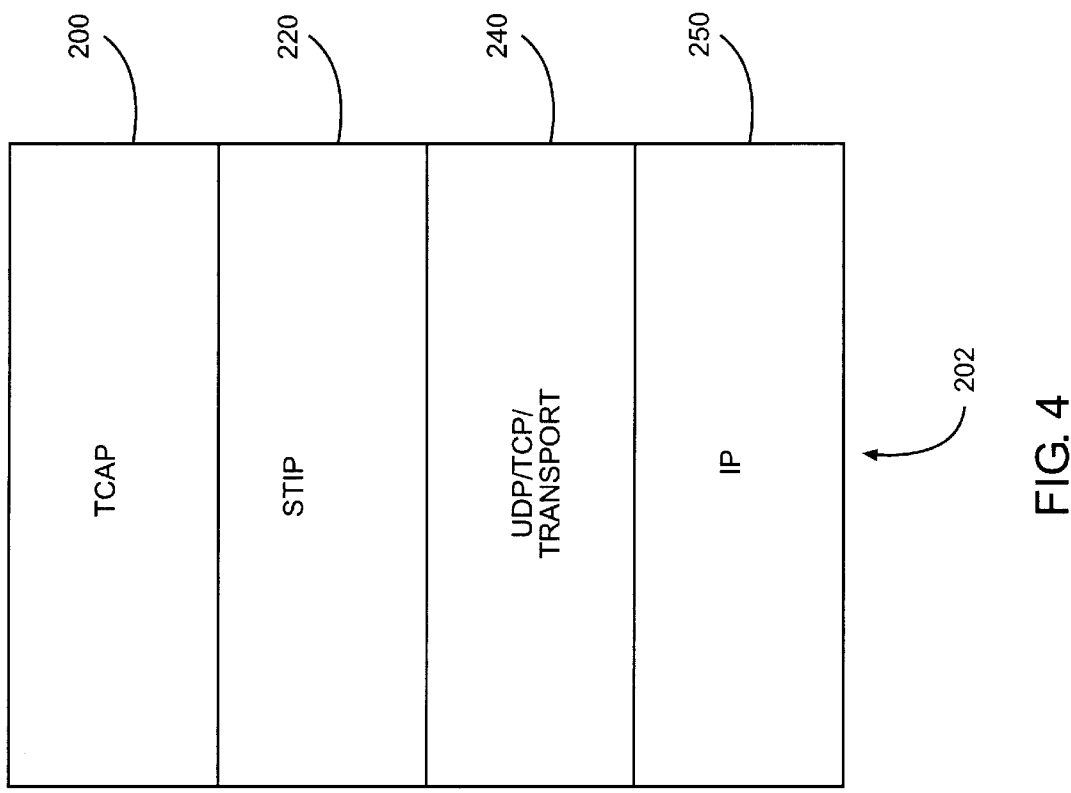
FIG. 4 is a block diagram illustrating a protocol stack for transporting messages between IP network nodes, according to one embodiment of the present invention.

In one embodiment, the present invention provides a protocol, represented as a computer data signal, for exchanging an encapsulated message between two internet protocol network entities. The computer data signal is embodied as an electrical signal represented as a plurality of bits, which represent a protocol stack for use in an internet protocol network. The plurality of bits can be stored sequentially in storage within a network entity, transmitted between network entities, or both. Further, the plurality of bits can be read, modified, written, and otherwise processed by a processor, such as a microprocessor or other processing device. As shown in FIG. 4, one embodiment of the present invention provides a protocol stack 202 represented as a computer data signal for transporting an encapsulated message between internet protocol network entities. The computer data signal comprises an internet protocol portion 250 which supports physical layer functions, datalink layer functions, and network layer functions compatible with an internet protocol network. Preferably, the internet protocol portion comprises the lower three layers of the IP protocol, such as the physical, datalink, and network IP layers, although three other layers compatible in function with the IP protocol could be used. Further, the computer data signal comprises a transport portion 240, operably connected to the internet protocol portion. The transport portion supports transport layer functions compatible with an internet protocol network. Preferably, the transport portion comprises an IP transport layer, such as UDP or TCP, although another transport layer compatible in function with the IP protocol may be used. In addition, the computer data signal comprises a STIP (Simple TCAP Interworking Part) portion 220 operably connected to the transport portion. The STIP portion of the present invention is adapted to exchange a message encapsulated therein between two internet protocol network entities, so that services interworking is supported therebetween. Preferably, the STIP portion comprises a STIP header for encapsulating a message therein, and preferably, the encapsulated message comprises a TCAP message. The STIP portion and STIP header are not necessarily fixed in size, and can assume various sizes as required to encapsulate and transport a particular message through an internet protocol network.

The STIP portion is defined by the present invention and optimized to execute its functions. Various embodiments of a STIP portion may be implemented within the spirit and scope of the present invention. Accordingly, one embodiment of the STIP portion is illustrated in FIG. 5(a). The STIP portion 220 or STIP header can comprise a version field 221. The content of the version field contains information relating to the version of the STIP portion or header. Through the version field information, the version of the STIP portion may be identified to at least one internet protocol network entity. In addition, the STIP portion or STIP header can comprise a message type field 222, such that the type of message may be identified to at least one internet protocol network entity. The content of the message type field contains information relating to type of message transported in the STIP header, preferably transported in a data field 229 encapsulated within the STIP header. The message type field may identify many message types, including but not limited to a protocol message type, such as a Login message type, a Login Acknowledgement message type, a security packet message type, a CHAP packet message type, a TIPG status message type, an IP entity status message type, or another status message type. Further, the message field may identify at least one data message type, including but not limited to a TCAP data message type, a TCAP data error message type, or some other data and/or data error message type. While the present invention is operable with many different types of messages, the preferred embodiment includes the aforementioned message types. The preferred message types are described below.

The Login message type is preferably sent from an IP network entity to a TIPG interworking gateway or comparable device to begin the login process. A Login Acknowledgement message type is sent from the TIPG or comparable device to the IP network entity to report the results of the login request. Messages, such as TCAP messages for example, may be exchanged between the IP network entity and the TIPG or comparable device once the login process has been successfully completed. The CHAP packet message type may be transferred between an IP network entity and a TIPG gateway or comparable device. The originator of the message will vary according to the CHAP code field, while the Data field of the message must contain a CHAP packet as defined in the RFC 1994 standard. A TIPG Status message type is transmitted from a TIPG gateway or comparable device to an IP network entity. This message type is optional, can be sent periodically or as needed, and identifies the originating TIPG gateway or comparable device. The IP network entity can use this message to verify that a TIPG gateway or comparable device is operating and may be accessed. If the message is to be transmitted periodically, an IP network entity can expect to receive a TIPG Status message within a given time, or else the IP network entity can assume that the TIPG gateway or comparable device is inoperable or too busy to respond. In either case, the IP network entity can treat the TIPG gateway as unavailable and start to communicate with a backup TIPG gateway or comparable device and/or attempt to reestablish communications with the unavailable TIPG gateway.

The IP entity status message type is sent from an IP network entity to a TIPG gateway or comparable device. As above, this message type is optional, and can be sent periodically or as required. Preferably, an IP network entity transmits this message periodically to identify itself and inform a TIPG or comparable device that the IP network entity is still operational and available. If the message is to be transmitted periodically, a TIPG or comparable device can expect to receive an IP Entity Status message within a given time, or else the TIPG/comparable device can assume that the IP network entity is either too busy to respond or inoperable. In either case, the TIPG/comparable device can treat the IP network entity as unavailable and start to communicate with a backup IP network entity and/or attempt to reestablish communications with the unavailable IP network entity. In contrast, a TCAP Data message type can be transferred between an IP network entity and a TIPG/comparable device in either direction. The TCAP Data message type is used to transport the TCAP message and/or related data between a TIPG/comparable device and an IP network entity. The TCAP Data message type may include a protocol type, identification field, calling party address, and called party address. If the message is incorrect, contains errors, is transported to the incorrect destination, or is invalid for other reasons, the TCAP Data Error message may be used. The TCAP Data Error message can be sent in either direction between an IP network entity and a TIPG gateway or comparable device, to indicate that there are problems with a previously received TCAP Data message or the contents thereof. Preferably, the data portion of the TCAP Data Error message contains a copy of the related TCAP Data message. This message may contain an error reason, an identification field, additional status information, calling party address, and called party address.

In addition, the STIP portion or STIP header may comprise a message length field 223, such that information relating to at least part of the length of the STIP portion may be provided to at least one internet protocol entity. The message length field may be used to provide information relative to any part of the total length of the STIP portion. Preferably, the message length field can be used to indicate the total length of the packet, excluding the length of the version, message type, and message length fields. Still further, the STIP portion or header can comprise a data offset field 224, such that information indicating the data offset of the message within the STIP portion may be provided to at least one internet protocol entity.

The STIP portion or STIP header can also comprise at least one attribute field 225 as shown. One or more attribute fields may be included in the STIP header as required for transporting a given message, as shown in FIG. 5(*a*). Preferably but not necessarily, the attribute fields are proximate each other when multiple attribute fields are used. Each attribute field may contain one or more subfields, as shown in FIG. 5(*b*). As such, an attribute field may include an attribute type subfield 226 containing information relative to the type of attribute that can be provided to at least one internet protocol network entity. Further, an attribute field may comprise a value subfield 228, such that information relative to the attribute may be provided to at least one internet protocol network entity. In addition, an attribute field may comprise a length subfield 227, such that information relative to the length of the value subfield may be provided to at least one internet protocol network entity.

The attributetype subfield 226 can contain many types of information relating to messages. For instance, the attributetype subfield can include one or more parameters such as a system name, a primary/backup system identifier, a subsystem number, an encryption index, an address mapping option identifier, a message encryption parameter, TIPG status, IP entity status, additional status, a protocol type identifier, an IP address, a calling party and/or a called party address, a sequential number identification value, and an error reason. Of course, other parameters may be provided for the attributetype subfield. In particular, the system name parameter contains information relating to the name of the system to be authenticated by the TIPG interworking gateway or comparable device. Preferably but not exclusively, the system name may be used within the Login message type. Further, the primary/backup system identifier parameter indicates to the TIPG or comparable device whether the logged in system is operating as a primary or backup system, in the SS7 network redundancy sense. Preferably but not exclusively, the primary/backup parameter is used within the Login message type. A subsystem number parameter identifies the subsystem number of an IP entity, and can include all SS7 information relative to a subsystem number. As above, the subsystem number is preferably but not exclusively used within the Login message type. The encryption index parameter contains the index of a predefined encryption algorithm(s) supported by the TIPG interworking gateway or comparable device. Information relative to the encryption index, its length, and its actual value can be provided.

In addition, an address mapping option identifier parameter can be used within the attributetype subfield 226 to permit the IP network entity to select one of two address mapping techniques. For the first technique, the address transformation is included within the message transferred between the TIPG gateway or comparable device and the IP network entity. In the second technique, the TIPG gateway or comparable device maintains the mapping between the Transaction ID and the Calling/Called party addresses, and performs address mapping as required. The address mapping option parameter is preferably used within the Login message type, although it can also be used with other message types. The contents of the address mapping option parameter may identify the mapping option parameter, the length of the parameter, and an address mapping value to identify which address mapping technique is used. Further, the attributetype subfield can contain a message encryption parameter that contains the flags or variables used by the TIPG gateway or comparable device to inform the IP network entity whether or not encryption/decryption is needed for a message transferred between the TIPG or similar device and the IP network entity. The message encryption parameter is preferably but not exclusively used within the Login Acknowledgement message type, and can indicate further details regarding the type and manner of encryption to be used.

The attribute type subfield can also provide status information of several types. A TIPG status parameter can provide a variety of status information relating to a TIPG interworking gateway or comparable device. The TIPG status parameter is preferably but not exclusively used within the TIPG Status message type. Similarly, the IP entity status parameter may provide a variety of status information regarding to the IP entity, and is preferably but not exclusively used within the IP Entity Status message type. In addition, the attributetype subfield can contain an additional status information parameter, which can contain additional status information of various types and formats. For instance, this parameter may contain text characters, hex/binary information, combinations thereof, or the like. This parameter is optional, and may be used with either the TIPG Status or IP Entity status message types.

In addition, the attributetype subfield can include a protocol type parameter, used to indicate the protocol type of the encapsulated message. Preferably but not necessarily, the protocol type parameter may be used to indicate the protocol type of the encapsulated TCAP message. This parameter is optional, but preferably the IP network entity may include this parameter in a Login message type to indicate to a TIPG or comparable device what protocol(s) the IP network entity can support. For instance, the protocol type can be TCAP, IS-41, MAP (Mobile Application Part), TBD, or combinations thereof. The attributetype subfield can also include various types of addresses. As such, an IP address parameter can be provided therein, containing the IP address of the IP network entity. The IP address parameter is optional, and may be used within any attribute types transmitted from the IP network entity to a TIPG interworking gateway or comparable device. This parameter can support IP Version 4, IP Version 6, or other types of IP addresses. In addition, a Calling Party and/or Called Party Address parameter can be included in the attributetype subfield. This parameter contains established SCCP Party Address information, and is preferably but not exclusively used within the TCAP Data message type exchanged between a TIPG or comparable device and an IP network entity. This parameter may include the Calling Party and/or Called Party address and associated sub-parameters.

The attributetype subfield may contain identification information, such as a sequential number identification parameter. This optional parameter contains the sequential number that is used to prevent a replay attack, and may be used with any message or protocol except CHAP messages. In addition, this parameter may be included in the Login and Login Acknowledgement messages for synchronization purposes. A TIPG interworking gateway or comparable device must maintain the identification parameter value for each IP network entity. If an IP network entity supports the use of the identification parameter, the IP network entity must include it in the Login message type with appropriately set flags or variables therein. The TIPG or comparable device must respond appropriately with a Login Acknowledgement message with appropriately set flags or variables therein. Thereafter, any messages sent from the IP network entity to the TIPG or comparable device must increment the identification parameter value by one, and contain appropriately set flags or variables. A TIPG or comparable device will record the previous identification parameter and check the identification parameter of an incoming message accordingly to increment the identification parameter and properly set flags or variables. If an incoming message fails to check out properly, the message will be discarded since it cannot be trusted. Any messages sent from the TIPG or comparable device to an IP network entity should also be incremented and contain properly set flags or variables, so that the IP network entity can similarly check incoming messages. The IP entity will also discard any messages that fail to check out properly. Lastly, the attribute type subfield may contain an error reason parameter that indicates the reason why an IP network entity or TIPG or comparable device cannot process an incoming message, such as a TCAP message for example. This parameter is preferably but not necessarily used within the TCAP Data Error message type. Preferably, the error reason should be mapped to the Error parameter as defined in SS7 SCP UDTS (Unit Data Service) or XUDTS (Extended Unit Data Service) message. Of course, those skilled in the art will realize that other parameters can be provided within the attribute type subfield within the spirit and scope of the present invention.

Still further, the STIP portion or STIP header can also comprise at least one data field 229, such that the encapsulated message can be transported and exchanged between internet protocol network entities. Those skilled in the art will understand that the data field can vary in size and format as required. Further, those skilled in the art will appreciate that the data field can contain data, commands, or both, encapsulated therein. The format of the data message is message dependent, and can even be null, such as when a Login command message or a Login Acknowledgement command message is sent. Preferably but not necessarily, the data field can comprise a TCAP message, such that an encapsulated TCAP message can be transported and exchanged between internet protocol network entities. Accordingly, services interworking is supported by exchanging encapsulated TCAP messages between network entities.

Accordingly, the protocol provided by the present invention serves to transport a TCAP message between an IP network entity and a TIPG gateway or comparable device, such that full services interworking may be supported between an IP network and a public telephone network. The protocol stack of the present invention encapsulates and transports a TCAP message through an internet protocol network without altering the characteristics thereof. Complimentary computer program products and related methods provided by the present invention serve to encapsulate, transport, manage, and decapsulate the TCAP message through an internet protocol network.

IP/PTN Gateway Computer Program Product and Method

Figure 3:
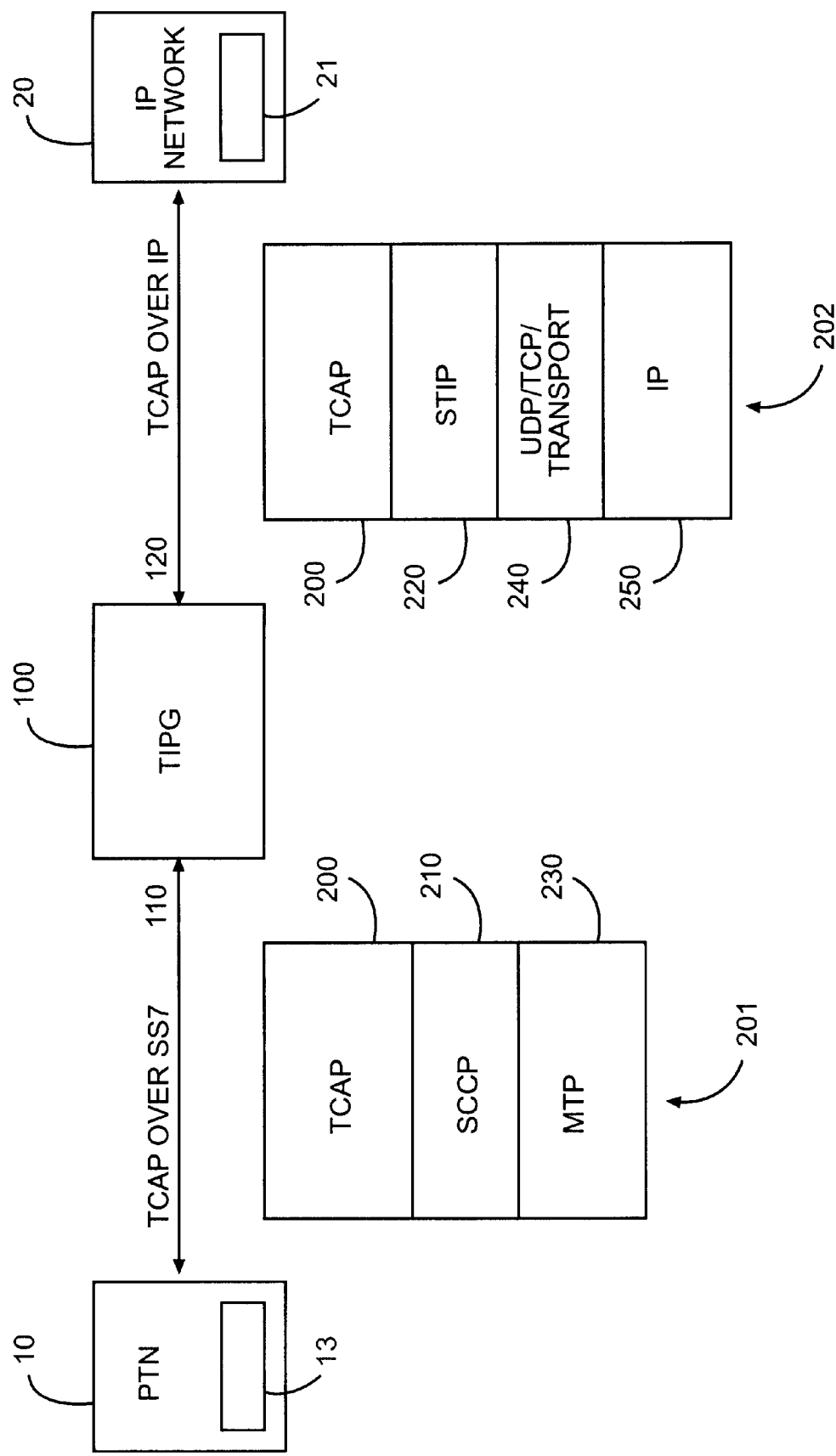
FIG. 3 is a block diagram illustrating the protocol interfaces between network nodes in an IP network and in a public telephone network as supported by an interworking gateway computer program product, according to one embodiment of the present invention.

As described, one computer program product is preferably executed within an interworking gateway, such as the TIPG (TCAP/IP Interworking Gateway) 100 shown in FIG. 3, which serves to exchange TCAP messages between the IP network and the public telephone network. Of course, the computer program product can be executed in another comparable device providing similar gateway functions. The computer program product is adapted for execution by a processor, such as by a microprocessor or other processing device, in a TIPG gateway or comparable device. The related method of the present invention similarly reflects IP I PTN interworking gateway operations and functions.

As such, one embodiment of the present invention provides a computer program product for an interworking gateway exchanging TCAP messages in an SS7 protocol format with a public telephone network and exchanging encapsulated TCAP messages in an IP protocol format with an internet protocol network. The computer program product further comprises a computer readable storage medium having computer readable program code means embodied therein. In addition, the computer readable program code means further comprises several computer instruction means for implementing the required functions.

Accordingly, within the computer readable storage means the computer readable program code means comprises computer instruction means for receiving a TCAP message in the SS7 protocol format from the public telephone network and extracting the TCAP message and associated addressing and routing information therefrom. Further, the computer readable program code means comprises computer instruction means for converting the associated addressing and routing information for the IP protocol format and encapsulating the TCAP message in the IP protocol format with the converted addressing and routing information. In addition, the computer readable program code means comprises computer instruction means for transmitting the encapsulated TCAP message with the converted addressing and routing information to the internet protocol network for delivery to an IP network entity therein. In essence, the computer program product extracts a TCAP message from an incoming message from one network, converts the addressing and routing information for transporting the TCAP message to a network entity in the destination network, and encapsulates the TCAP message with the converted addressing and routing information and forwards the encapsulated message to the destination network in the proper protocol format for delivery. As those skilled in the art will appreciate, messages originating in either the IP network or PTN network can be processed in this manner and forwarded to the other of the IP network and PTN network.

Accordingly, a further embodiment of the computer readable program code of the computer program product further comprises additional computer instruction means. In particular, the computer readable program code further comprises computer instruction means for receiving an encapsulated TCAP message in the IP protocol format from the internet protocol network and extracting the TCAP message and associated addressing and routing information therefrom. The computer readable program code further comprises computer instruction means for converting the associated addressing and routing information for the SS7 protocol format and encapsulating the TCAP message into the SS7 protocol format with the converted addressing and routing information. In addition, the computer readable program code further comprises computer instruction means for transmitting the TCAP message with the converted addressing and routing information to the public telephone network for delivery to an SS7 network entity therein. Therefore, the computer program product can transport messages between both networks. Of course, in the internet protocol format the encapsulated message is preferably but not necessarily transported in the aforementioned STIP protocol portion and STIP header.

One embodiment of the computer program product further defines both computer instruction means for converting addressing and routing information. In this case, both computer instruction means for converting addressing and routing information further comprise STIP (Simple TCAP Interworking Part) computer instruction means for processing encapsulated TCAP messages with the addressing and routing information in the IP protocol format exchanged with the internet protocol network. In addition, the STIP computer instruction means may further comprise computer instruction means for decapsulating the TCAP message received in the SS7 protocol format from the public telephone network, and encapsulating the TCAP message in the IP protocol format for transmission to the internet protocol network. An example of the SS7 network to IP network processing, which includes decapsulation, addressing/routing transformation, and encapsulation is shown in FIG. 6(a). Note that the TCAP portion is extracted by the decapsulation process and thereafter encapsulated for transportation to the destination network. Similarly, the STIP computer instruction means can comprise computer instruction means for decapsulating the TCAP message received in the IP protocol format from the internet protocol network, and encapsulating the TCAP message in the SS7 protocol format for transmission to the public telephone network. An example of the IP network to SS7 network processing, which similarly includes decapsulation, addressing/routing transformation, and encapsulation is shown in FIG. 6(b). As before, the TCAP portion is extracted by the decapsulation process and thereafter encapsulated for transportation to the destination network. Further, the STIP computer instruction means may further comprise computer instruction means for interacting with the IP network entity and the internet protocol network through a STIPP protocol stack in the IP protocol format. Preferably, the interaction occurs through the STIPP protocol stack and STIP header as described above.

In one embodiment, the STIP computer instruction means of the computer program product provides additional message processing. Specifically, the STIP computer instruction means can further comprise computer instruction means for performing address mapping and translation, such that the IP network entity can be addressed by a point code and subsystem number to the public telephone network and by an IP address and a port number to the internet protocol network. In addition, the STIP computer instruction means may also comprise computer instruction means for performing extended global title translation, such that a destination node in the public telephone network is identified by at least one of a point code and a subsystem number of an application entity within the destination node, and such that a destination node in the internet protocol network is identified by an IP address and a port number. The aforementioned translations are necessary to modify the protocol format and transport a message to the destination network.

Computer program instruction means are used to remap an address of an incoming message received from one network, such as an IP network or a PTN network, into an address appropriate for the other network of the IP network and the PTN network. Optionally, each IP network node address may comprise an IP address and a port number. FIG. 3 provides illustrations useful for understanding address remapping and translation operations. For instance, IP entity 21 is assigned a unique IP node address in an IP network consisting of an IP address and a port number. Further, each PTN/SS7 network node is assigned with a destination point code. For example, PTN/SS7 network entity 13 is assigned a unique SS7 address in the PTN/SS7 network consisting of a destination point code. Addressing destination nodes in either network is managed by computer program instruction means preferably maintaining addressing tables in computer memory, such that address translations may be performed efficiently. In the PTN/SS7 network, the established SCCP Global Title Translation (GTT) function is used to determine the address of a destination node in the SS7 network. Based on the address mapping data, the GTT determines a destination node in the PTN/SS7 network and optionally a subsystem number of a destination application within the network node. The computer program instruction means extend the global title addressing concept to apply to addressing IP network nodes as well by extending the address translation function to include IP node addresses, such as an IP address and a port number. The Global Title Translation (GTT) function provided by a STIP computer instruction means determines the destination address of an IP network node from an incoming TCAP message received from the PTN/SS7 network. The address translation functions performed when a message is received from an IP network or PTN/SS7 network will be described below.

FIG. 3 further provides details regarding the messaging formats supported by a TIPG interworking gateway or comparable device executing the aforementioned computer program product. The gateway operates to effectively interconnect two networks, an IP network and a public telephone network. Software functionality in the gateway can provide SCCP addressing and routing to the PTN/SS7 network, and addressing and routing similar to, or approximate to, SCCP addressing and routing to an IP network. Software functionality in the gateway can process and exchange encapsulated messages, such as TCAP messages, with an IP network. The STIPP protocol stack and STIP computer instruction means provide addressing similar to SCCP addressing when TCAP messages are transported over the IP protocol in an IP network. In addition, a TCAP message received from the PTN network in an SS7 protocol format can be translated into an IP protocol format and encapsulated for transmission to an IP network, without altering the TCAP characteristics of the incoming message. As shown in FIG. 3 for instance, the TCAP message 200 is transported in an SS7 protocol format 201 in the PTN network, while the TCAP message 200 is transported in an IP protocol format 202 in an IP network, as shown. Since the translated TCAP message is forwarded to an IP network, the destination IP network entity or node in an IP network preferably executes a compatible STIP software application for processing the encapsulated TCAP message. For example, STIP functions must be resident in the TIPG interworking gateway 100 and in an IP network entity in an IP network 20. As such, the translated TCAP messages received can be interpreted, while TCAP messages can be created and forwarded to an IP network and the interworking gateway. The STIP software applications executing in the IP entity and in the interworking gateway could be identical, although this is not required. At a minimum, the STIP applications in the IP entity and interworking gateway must work compatibly together.

As such, a TCAP message in the first format transmitted and received in a public telephone message comprises a TCAP portion 200, an SCCP portion 210, and an MTP portion 230, as shown. When the TCAP message is received from the PTN network by an interworking gateway executing the aforementioned computer program product, the TCAP message is extracted from the SS7 protocol format 201 and encompassed into the IP protocol format 202, that is, into an encapsulated TCAP message format for transport through the IP network. The encapsulated TCAP message in the IP protocol format comprises a TCAP portion 200, a STIP portion 220, and an IP portion 250, at least. Further, the encapsulated TCAP message may further include a transport portion 240, such as TCP, UDP, or another IP network transport portion, disposed between the STIP portion and the IP portion to serve as a transport layer in an IP network. After translation into the appropriate format for the destination network, the encapsulated TCAP message is transmitted to an IP network to be forwarded to the destination IP network entity.

The interworking gateway executing the aforementioned computer program product provides analogous translation capabilities for messages received in the second format from an IP network. Accordingly, messages can be received from either network, transformed, and transmitted on to the other network in a compatible protocol format. An encapsulated TCAP message can be received in the IP protocol format from an IP network, and translated into the SS7 protocol format suitable for transmission to the PTN network, without altering the TCAP characteristics of the incoming message. The encapsulated TCAP message received from an IP network has at least a TCAP portion, a STIP portion, and an IP protocol portion. In addition, the encapsulated TCAP message may further include a transport portion as described above disposed between the STIP portion and the IP protocol portion. The translated TCAP message in the first format comprises at least a TCAP portion, an SCCP portion, and an MTP portion, whether or not the encapsulated TCAP message included a transport portion. Once translated by the processor, the encapsulated TCAP message is transmitted to the PTN network in the SS7 protocol format to be forwarded to the corresponding PTN network destination node.

Address translation processing must be performed on an incoming message received from one network in order to forward a representative message to the destination in other network. When an incoming TCAP message is received from the PTN/SS7 network, an IP network destination node address is determined by analyzing the destination point code (DPC) and the called party address (CdPA) of the incoming SS7 TCAP message. If the DPC is the TIPG interworking gateway or comparable device executing the aforementioned computer program product, the destination is a TCAP software application program executing in an IP network node, which can be an IP network entity or another TIPG gateway/comparable device. The Routing Indicator in the Called Party Address (CdPA) is used to determine the ultimate destination node in an IP network. If a subsystem number (SSN) routing is available, the message is forwarded to an IP network entity having the same SSN. If Global Title routing is used, STIP performs the GTT translation to obtain the address of the destination, and forwards the message there.

If the DPC is not the TIPG interworking gateway or comparable device, then the signaling transport function is requested. Thereafter, the STIP computer instruction means retrieves the IP network node address, or IP address, of a far end TIPG gateway and forwards the message there. In addition, since a reply message caused by the forwarded message may need to returned to the originating network node in the PTN network, the STIP computer instruction means records the DPC with the incoming IP address and port number when the message is sent to the far end TIPG gateway. Over time, old DPC/IP/port number entries in the address table are overwritten or "aged out" if not used as frequently as other entries in the address table. If the TIPG gateway/comparable device is not the DPC, the SCCP Called Party Address (CdPA) and Calling Party Address (CgPA) fields from the incoming TCAP message received from the PTN/SS7 network are copied into the corresponding CdPA and CgPA fields in the STIP layer of the message to be forwarded to an IP network. However, if the SCCP CdPA field only contains a subsystem number, the DPC must be combined into the corresponding STIP CdPA field to permit the far end TIPG gateway/comparable device to send the message to a PTN/SS7 network connected thereto. Also, if the SCCP CgPA field only contains a subsystem number, the OPC parameter from the incoming TCAP message must be combined into the corresponding STIP CgPA field to permit the response message to be sent back to the originating network node.

When an incoming encapsulated TCAP message is received by the TIPG gateway/comparable device, the destination node address must be determined by analyzing the received message. If the STIP CdPA (Called Party Address) indicates that Global Title routing is used, then Global Title Translation is performed by using the address translation table. If the destination address is an IP network address, then the message is forwarded on to the IP network entity. If the destination address is a point code in the PTN/SS7 network, then set the destination point code to the SS7 point code. That is, a TCAP message is sent from an application in IP network to an application in PTN/SS7 network. The STIP layer CdPA and CgPA fields from the encapsulated TCAP message received are copied into the SCCP layer CdPA and CgPA respectively. If the STIP CdPA field contains a point code explicitly and a subsystem number, the subsystem number is copied into the SCCP CdPA field and the point code is used as the destination point code for the MTP layer to route the message. If the STIP CdPA field indicates that Global Title routing is used, and the STIP CgPA field only contains a subsystem number, the message was originated from an IP entity. In this case, the STIP computer instruction means adds the point code associated with the receiving TIPG gateway/comparable device into the SCCP CgPA field so that a response message can be sent back to the TIPG gateway/comparable device, if needed.

A further embodiment of the computer program product according to the present invention includes additional interworking gateway functions. As such, the STIP computer instruction means may further comprise computer instruction means for emulating SCCP flow control commands and functions for IP network entities in the internet protocol network represented to the public telephone network. While SCCP flow control commands and functions are known in the SS7 protocol format and public telephone network, the present invention extends these commands and functions into the IP protocol format and internet protocol network. As those skilled in the art will understand, flow control functions are used to ensure that devices within a network can process and relay information according to the ability of those devices to handle information at a particular time. As such, flow control functions are used to provide steady information flow and help prevent situations wherein network devices are either overloaded or underutilized.

In addition, the STIP computer instruction means may further comprise computer instruction means for performing protocol discrimination for the TCAP message received from the public telephone network, such that at least one of the TCAP standard and the upper layer messaging protocol associated with the TCAP message can be identified. As used herein, protocol discrimination describes the process of analyzing a received message so that specific details regarding the protocol used can be determined, so that the message can be processed properly and a subsequent reply message will also be formatted according to the protocol used. Information regarding the type of messaging being used, the contents of the message, or the type of software application program that can process and incoming message may be discriminated. For example, details regarding the message type, or whether an incoming TCAP message is in IS-41 or MAP (Mobile Application Part) format can be determined by analyzing an incoming message.

Further, the STIP computer instruction means provides additional functions. In one embodiment, the STIP computer instruction means further comprises computer instruction means for providing security functions to authenticate the IP network entity before TCAP messages are exchanged with the IP network entity. Preferably, the STIP computer instruction means can further comprise computer instruction means for providing CHAP security functions for authenticating the IP network entity. However, other security functions, such as DES, RSA, public key algorithms, or combinations thereof can also be used to provide security and authentication functions. In addition, the STIP computer instruction means can further comprise computer instruction means for providing mediation functions to ensure that information is accessed and modified only by an authorized IP network entity or public telephone network entity. For example, mediation functions would prevent one telephony service provider, or telephone company, from being able to access and/or modify information belonging to another telephony service provider.

Related Interworking Gateway Functionality Method

In one embodiment, the present invention provides a method for exchanging TCAP messages between a public telephone network and an internet protocol network for providing services interworking. The method comprises the step of receiving a TCAP message and associated addressing and routing information in an SS7 protocol format from the public telephone network. In addition, the method comprises the step of extracting the TCAP message and associated addressing and routing information from the TCAP message received. Further, the method comprises the step of converting the associated addressing and routing information for an IP protocol format and encapsulating the TCAP message in the IP protocol format with the converted addressing and routing information. Still further, the method comprises the step of transmitting the encapsulated TCAP message with the converted addressing and routing information to the internet protocol format network for delivery to an IP network entity therein.

A further embodiment of the method comprises additional steps. In particular, the method can comprise the step of receiving an encapsulated TCAP message in the IP protocol format from the internet protocol network and extracting the TCAP message and associated addressing and routing information therefrom. In addition, the method can further comprise the step of converting the associated addressing and routing information for the SS7 protocol format and encapsulating the TCAP message into the SS7 protocol format with the converted addressing and routing information. The method can further comprise the step of transmitting the TCAP message with the converted addressing and routing information to the public telephone network for delivery to an SS7 network entity therein, after said transmitting step. Further, the converting and encapsulating for the IP protocol step may comprise extracting the TCAP message from the SS7 protocol format and encapsulating the TCAP message in a STIP protocol header in the IP protocol format, and the converting and decapsulating for the SS7 protocol step may comprise extracting the TCAP message from the STIP protocol header in the IP protocol format and encapsulating the TCAP message in the SS7 protocol format. In addition, both converting steps of the method can further comprise the step of performing at least one translation selected from the group consisting of an address translation and a global title translation on the respective TCAP message received. Accordingly, the method and aforementioned computer program product serve to transport TCAP messages between the IP network domain and the public telephone network domain, such that interworking services between the networks is supported.

IP Network Entity Computer Program Product and Method

The present invention provides a complimentary computer program product and related method for the IP network entity, such that effective interaction with the TIPG interworking gateway or comparable device is supported. Interaction with the TIPG gateway/comparable device is achieved through STIPP (Simple TCAP-IP Interworking Protocol) messages in an IP protocol format as described above. The computer program product is adapted for execution by a processor, such as a microprocessor or other processing device, in an IP network entity, IP server, comparable device. Those skilled in the art will appreciate that the computer program products of the TIPG interworking gateway and the IP network entity must at a minimum be complimentary in operation. While the respective computer program products can be identical, this is not necessary or required. However, the protocol, commands, messages, fields, subfields, and parameters exchanged and used to communicate therebetween must of course be compatible.

Accordingly, the present invention further provides a computer program product for an IP network entity exchanging encapsulated TCAP messages in an IP protocol format with an internet protocol network, such that TCAP messages can therethrough be exchanged with a public telephone network. The computer program product is suitable for execution by a processor, and further comprises a computer readable storage medium having computer readable program code means embodied therein. In addition, the computer readable program code means further comprises several computer instruction means for implementing the required functions. In particular, the computer readable program code means comprises computer instruction means for receiving a TCAP message encapsulated in the IP protocol format from the internet protocol network, wherein the TCAP message originated in the public telephone network. Further, the computer readable program code means comprises computer instruction means for extracting the TCAP message and the associated addressing and routing information from the encapsulated TCAP message received. The computer readable program code means further comprises computer instruction means for processing the TCAP message originating in the public telephone network and received by the IP network entity.

Figure 7:
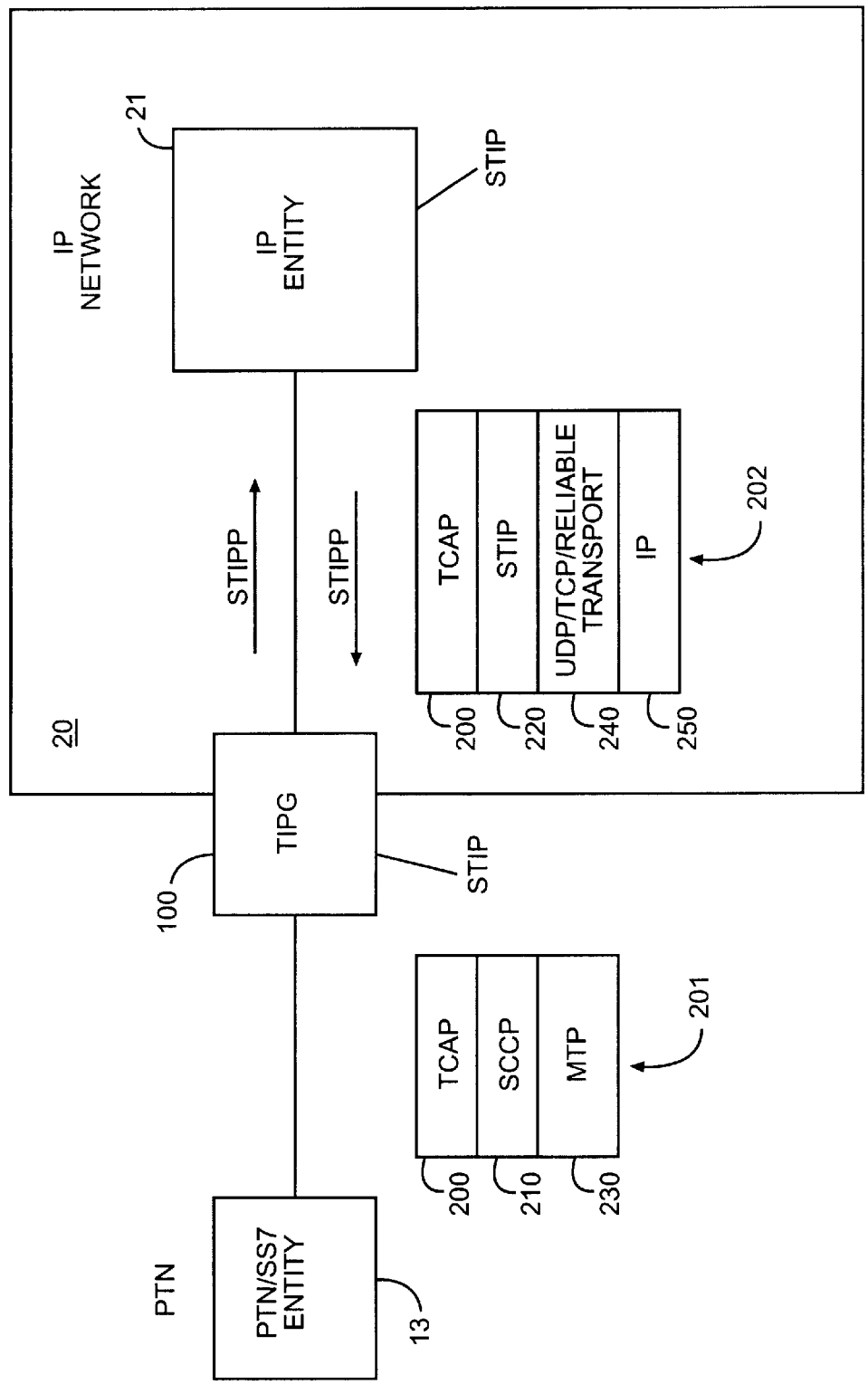
FIG. 7 is a diagram illustrating the protocol and computer program product interface between an IP network entity and an interworking gateway in an IP network, according to one embodiment of the present invention.

In another embodiment of the computer program product, the computer readable program code means further comprises computer instruction means for encapsulating a TCAP message in the IP protocol format for the internet protocol network, wherein the TCAP message originated in the IP network entity. Further, the computer readable program code means further comprises computer instruction means for transmitting the TCAP message through the internet protocol network to an SS7 network entity in the public telephone network. Accordingly, the computer program product of the IP network entity can process an encapsulated TCAP message received from an IP network and extract the TCAP message. Accordingly, the computer program product of the IP network entity can encapsulate a TCAP message and transmit an encapsulated TCAP message to an IP network. Preferably but not necessarily, the IP network entity interacts with a TIPG interworking gateway or comparable device. As such, the preferred environment for the computer program product in an IP network is shown in FIG. 7.

In particular, the computer program product of the IP network entity is adapted to transmit and receive an encapsulated message, such as a TCAP message preferably, in the IP protocol format, as described above. Therefore, function complimentary to the TIPG interworking gateway function is required, such that TCAP messages encapsulated in the IP protocol format can be exchanged and mutually interpreted to provide full interworking. The interrelationship between the TIPG interworking gateway or comparable device and the complimentary IP entity is shown in FIG. 7. The IP network entity executed the corresponding computer program product for exchanging encapsulated TCAP messages with an IP network and/or a TIPG gateway or compatible device.

As such, the computer program product of the IP network entity is adapted to extract a TCAP message from an encapsulated TCAP message in the IP protocol format received from an IP network. Further, the computer program product is adapted to encapsulate a TCAP message and forward the encapsulated TCAP message in the IP protocol format to an IP network and/or a TIPG gateway or compatible device. Thus, encapsulated TCAP messages can be exchanged between the IP network entity and an IP network as shown. Further, the IP network entity processor can be adapted to execute one or more TCAP software application programs. As such, TCAP messages received by the IP network entity can be processed by the application program, and TCAP messages can be originated by the TCAP application program and transmitted to an IP network.

In addition, computer program product of the IP network entity can be adapted to execute a STIP software application program, as shown, such that SCCP primitives can be provided to the TCAP software application in order to send and receive TCAP messages therewith. The STIP computer instruction means can be identical to the STIP computer instruction means executing in the TIPG interworking gateway/comparable device 100, if desired. However, the only requirement is that the STIP computer instruction means of the IP entity 21 be compatible with the STIP computer instruction means of the TIPG gateway/comparable device. The STIP computer instruction means provide addressing and routing functions for TCAP applications executing in the IP entity. The addressing and routing used can be the same as that provided by the STIP computer instruction means executing within a TIPG gateway or comparable device. However, since the IP network entity 21 is not an SS7 network entity, it does not require an SS7 point code and therefore does not utilize any point code sent to it from a TIPG gateway or comparable device. In addition, STIP computer instruction means executing in the IP entity provide the same three SCCP primitives provided by the SS7 network to a TCAP application, such as N-UNITDATA request, N-UNIT DATA indication, and N-NOTICE indication primitives. Since telephony services can be provided by exchanging TCAP messages, telephony services can be provided across an IP network and an interworked PTN by exchanging encapsulated TCAP messages therebetween.

When incoming encapsulated TCAP messages are received by the IP network entity 21 the message is passed to the TCAP application using the N-UNITDATA indication primitive with CdPA, CgPA, and TCAP data parameters. When outgoing messages are to be sent from the IP network 21, the STIP computer instruction means obtains data parameters from the TCAP application using the N-UNITDATA request primitive with CdPA, CgPA, and TCAP data parameters. The addressing information added to the outbound TCAP message comprises either a destination point code and a subsystem number (from the STIP CgPA field of the received message) or a Global Title. The TCAP application may or may not provide CgPA, so the CgPA is defined to be the same subsystem number as that is assigned to the IP entity. Eventually, the STIP computer instruction means forwards the message in the IP format to some interconnected TIPG interworking gateway or comparable device.

As noted, the computer program product further comprises STIP computer instruction means for encapsulating and decapsulating TCAP messages with the addressing and routing information in the IP protocol format exchanged with the internet protocol network. In addition, the STIP computer instruction means can further comprise computer instruction means for interacting with the internet protocol network through a STIPP protocol stack in the IP protocol format. The computer instruction means for processing the TCAP message received can further comprise computer instruction means for analyzing the TCAP message received, to determine whether data incorporated therein can be processed by the IP network entity and whether a data error message should be returned to the originating public telephone network. In essence, the computer program product of the IP network entity includes message format and message integrity checking functions. In addition, the computer instruction means for processing the TCAP message received may further comprise computer instruction means for providing security functions, so as to authenticate the IP network entity before TCAP messages are exchanged with the IP network entity. Preferably but not necessarily, computer instruction means for providing CHAP security functions may be used to authenticate the IP network entity before TCAP messages are exchanged with the IP network entity. Of course, all of the aforementioned capabilities of the computer program product for the IP network entity must be compatible with the computer program product for a TIPG gateway or comparable device. As noted, while the computer program products can be identical, this is not a requirement.

Related IP Network Entity Method

In a further embodiment, the present invention provides a method for exchanging encapsulated TCAP messages with an internet protocol network such that TCAP messages can therethrough be exchanged with a public telephone network. Specifically, the method comprises the step of receiving a TCAP message encapsulated in an IP protocol format from the internet protocol network, wherein the TCAP message originated in the public telephone network. In addition, the method comprises the step of extracting the TCAP message and the associated addressing and routing information from the encapsulated TCAP message received. The method further comprises the step of processing the TCAP message originating in the public telephone network and received by the IP network entity.

Another embodiment of the method further comprises the step of encapsulating a TCAP message in the IP protocol format from the internet protocol network, wherein the TCAP message originated in the IP network entity. Further, the method includes the step of transmitting the TCAP message through the internet protocol network to an SS7 network entity in the public telephone network. In addition, the method can comprise the step of interacting with the internet protocol network through a STIPP protocol stack in the IP protocol format.

As such, the protocol, computer program products, and related methods support services interworking between an internet protocol network and a public telephone network by transporting TCAP messages across network domains. In particular, encapsulated TCAP messages are managed and exchanged between IP network nodes, such as a TIPG gateway or comparable device and an IP network entity, so that in turn, TCAP messages can be exchanged with the public telephone network through the functionality of a TIPG gateway or comparable device. Accordingly, the present invention addresses at least some unmet needs, while providing some advantages.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims which define the present invention. Further, while portions of the specification above are separated by headings for purposes of clarity and readability, the entire contents of the specification above should be used collectively for interpreting the present invention as claimed hereafter.

What is claimed is:

1. A computer data signal embodied in an electrical signal represented as a plurality of bits for exchanging an encapsulated message between two internet protocol network entities, comprising:

an internet protocol portion including supporting physical layer functions, datalink layer functions, and network layer functions compatible with an internet protocol network;

a transport portion operably connected to said internet protocol portion, said transport portion supporting transport layer functions compatible with the internet protocol network; and a STIP portion operably connected to said transport portion, said STIP portion adapted to exchange the encapsulated message between the two internet protocol network entities, such that services interworking is supported therebetween.

2. The computer data signal according to claim 1, wherein said STIP portion comprises a STIP header for transporting the encapsulated message therein.

3. The computer data signal according to claim 1, wherein said STIP portion comprises a version field, such that the version of the STIP portion may be identified to at least one internet protocol network entity.

4. The computer data signal according to claim 1, wherein the STIP portion comprises a message type field, such that the message type of the encapsulated message may be identified to at least one internet protocol entity.

5. The computer data signal according to claim 4, wherein the message type field comprises at least one protocol message type selected from the group consisting of a login message type, a login acknowledgement message type, a security packet message type, and a status message type.

6. The computer data signal according to claim 4, wherein the message type field comprises at least one data message type selected from the group consisting of a TCAP data message type and a TCAP data error message type.

7. The computer data signal according to claim 1, wherein the STIP portion comprises a message length field, such that information relating to at least part of the length of the STIP portion may be provided to at least one internet protocol entity.

8. The computer data signal according to claim 1, wherein the STIP portion comprises a data offset field, such that information indicating the data offset of the message within the STIP portion may be provided to at least one internet protocol entity.

9. The computer data signal according to claim 1, wherein said STIP portion comprises at least one attribute field, such that information relative to the type of message may be provided to at least one internet protocol network entity.

10. The computer data signal according to claim 9, wherein each attribute field further comprises a type subfield, such that information relative to the type of attribute may be provided to at least one internet protocol network entity.

11. The computer data signal according to claim 10, wherein the type subfield comprises at least one parameter selected from the group consisting of a system name, primary/backup system identifier, subsystem number, encryption index, address mapping option identifier, message encryption parameter, TIPG status, IP entity status, additional status, protocol type identifier, IP address, calling/called party address, sequential number identification value, and an error reason.

12. The computer data signal according to claim 9, wherein each attribute field further comprises a value subfield, such that information relative to the attribute may be provided to at least one internet protocol network entity.

13. The computer data signal according to claim 9, wherein each attribute field further comprises a length subfield, such that information relative to the length of the value subfield may be provided to at least one internet protocol network entity.

14. The computer data signal according to claim 1, wherein the STIP portion comprises a data field, such that the encapsulated message may be exchanged between internet protocol network entities.

15. The computer data signal according to claim 14, wherein the data field comprises an encapsulated TCAP message, such that the encapsulated TCAP message and/or command message may be exchanged between internet protocol network entities.

16. A computer program product for a gateway exchanging TCAP messages in an SS7 protocol format with a public telephone network and exchanging encapsulated TCAP messages in an IP protocol format with an internet protocol network, said computer program product comprising:
   a computer readable storage medium having computer readable program code means embodied therein, said computer readable program code means comprising:
      computer instruction means for receiving a TCAP message in the SS7 protocol format from the public telephone network and extracting the TCAP message and associated addressing and routing information therefrom;
      computer instruction means for converting the associated addressing and routing information for the IP protocol format and encapsulating the TCAP message in the IP protocol format with the converted addressing and routing information; and
      computer instruction means for transmitting the encapsulated TCAP message with the converted addressing and routing information to the internet protocol network for delivery to an IP network entity therein.

17. The computer program product according to claim 16, wherein said computer readable program code means further comprises:
   computer instruction means for receiving an encapsulated TCAP message in the IP protocol format from the internet protocol network and extracting the TCAP message and associated addressing and routing information therefrom;
   computer instruction means for converting the associated addressing and routing information for the SS7 protocol format and encapsulating the TCAP message into the SS7 protocol format with the converted addressing and routing information; and
   computer instruction means for transmitting the TCAP message with the converted addressing and routing information to the public telephone network for delivery to an SS7 network entity therein.

18. The computer program product according to claim 17, wherein both said computer instruction means for converting further comprise STIP computer instruction means for processing encapsulated TCAP messages with the addressing and routing information in the IP protocol format exchanged with the internet protocol network.

19. The computer program product according to claim 18, wherein said STIP computer instruction means further comprises computer instruction means for emulating SCCP flow control commands and functions for IP network entities in the internet protocol network represented to the public telephone network.

20. The computer program product according to claim 18, wherein said STIP computer instruction means further comprises computer instruction means for decapsulating the TCAP message received in the SS7 protocol format from the public telephone network, and encapsulating the TCAP message in the IP protocol format for transmission to the internet protocol network.

21. The computer program product according to claim 18, wherein said STIP computer instruction means further comprises computer instruction means for decapsulating the TCAP message received in the IP protocol format from the internet protocol network, and encapsulating the TCAP message in the SS7 protocol format for transmission to the public telephone network.

22. The computer program product according to claim 18, wherein said STIP computer instruction means further comprises computer instruction means for interacting with the IP network entity and the internet protocol network through a STIPP protocol stack in the IP protocol format.

23. The computer program product according to claim 18, wherein said STIP computer instruction means further comprises computer instruction means for performing address mapping and translation, such that the IP network entity can be addressed by a point code and subsystem number to the public telephone network and by an IP address and a port number to the internet protocol network.

24. The computer program product according to claim 18, wherein said STIP computer instruction means further comprises computer instruction means for performing extended global title translation, such that a destination node in the public telephone network is identified by at least one of a point code and a subsystem number of an application entity within the destination node, and such that a destination node in the internet protocol network is identified by an IP address and a port number.

25. The computer program product according to claim 18, wherein said STIP computer instruction means further comprises computer instruction means for performing protocol discrimination for the TCAP message received from the public telephone network, such that at least one of the TCAP standard and the upper layer messaging protocol associated with the TCAP message can be identified.

26. The computer program product according to claim 18, wherein said STIP computer instruction means further comprises computer instruction means for providing security functions to authenticate the IP network entity before TCAP messages are exchanged with the IP network entity.

27. The computer program product according to claim 18, wherein said STIP computer instruction means further comprises computer instruction means for providing CHAP security functions to authenticate the IP network entity before TCAP messages are exchanged with the IP network entity.

28. The computer program product according to claim 18, wherein said STIP computer instruction means further comprises computer instruction means for providing mediation functions to ensure that information is accessed and modified only by one of an authorized IP network entity and a public telephone network entity.

29. A computer program product for an IP network entity exchanging encapsulated TCAP messages in an IP protocol format with an internet protocol network such that TCAP messages can therethrough be exchanged with a public telephone network, said computer program product comprising:
   a computer readable storage medium having computer readable program code means embodied therein, said computer readable program code means comprising:
      computer instruction means for receiving a TCAP message encapsulated in the IP protocol format from the internet protocol network, wherein the TCAP message originated in the public telephone network;

computer instruction means for extracting the TCAP message and the associated addressing and routing information from the encapsulated TCAP message received; and computer instruction means for processing the TCAP message originating in the public telephone network and received by the IP network entity.

30. The computer program product according to claim 29, wherein said computer readable program code means further comprises:

computer instruction means for encapsulating a TCAP message in the IP protocol format for the internet protocol network, wherein the TCAP message originated in the IP network entity; and computer instruction means for transmitting the TCAP message through the internet protocol network to an SS7 network entity in the public telephone network.

31. The computer program product according to claim 30, further comprising STIP computer instruction means for encapsulating and decapsulating TCAP messages with the addressing and routing information in the IP protocol format exchanged with the internet protocol network.

32. The computer program product according to claim 31, wherein said STIP computer instruction means further comprises computer instruction means for interacting with the internet protocol network through a STIPP protocol stack in the IP protocol format.

33. The computer program product according to claim 31, wherein said STIP computer instruction means further comprises computer instruction means for analyzing the TCAP message received to determine whether data incorporated therein can be processed by the IP network entity and whether a data error message should be returned to the originating public telephone network.

34. The computer program product according to claim 31, wherein said STIP computer instruction means further comprises computer instruction means for providing security functions to authenticate the IP network entity before TCAP messages are exchanged with the IP network entity.

35. The computer program product according to claim 31, wherein said STIP computer instruction means further comprises computer instruction means for providing CHAP security functions to authenticate the IP network entity before TCAP messages are exchanged with the IP network entity.

36. The computer program product according to claim 31, wherein said STIP computer instruction means further comprises computer instruction means for providing functions of SCCP primitives, such that SCCP primitives can be provided to the TCAP software application in order to send and receive TCAP messages therewith.

37. A method for exchanging TCAP messages between a public telephone network and an internet protocol network for providing services interworking, comprising the steps of:

receiving a TCAP message and associated addressing and routing information in an SS7 protocol format from the public telephone network;

extracting the TCAP message and associated addressing and routing information from the TCAP message received;

converting the associated addressing and routing information for an IP protocol format and encapsulating the TCAP message in the IP protocol format with the converted addressing and routing information; and transmitting the encapsulated TCAP message with the converted addressing and routing information to the internet protocol format network for delivery to an IP network entity therein.

38. The method according to claim 37, further comprising the steps of:

receiving an encapsulated TCAP message in the IP protocol format from the internet protocol network and extracting the TCAP message and associated addressing and routing information therefrom;

converting the associated addressing and routing information for the SS7 protocol format and encapsulating the TCAP message into the SS7 protocol format with the converted addressing and routing information; and transmitting the TCAP message with the converted addressing and routing information to the public telephone network for delivery to an SS7 network entity therein, after said transmitting step.

39. The method according to claim 38, wherein the converting and encapsulating for the IP protocol step comprises extracting the TCAP message from the SS7 protocol format and encapsulating the TCAP message in a STIP protocol header in the IP protocol format, and wherein the converting and encapsulating for the SS7 protocol step comprises extracting the TCAP message from the STIP protocol header in the IP protocol format and encapsulating the TCAP message in the SS7 protocol format.

40. The method according to claim 38, wherein both converting steps further comprise the step of performing at least one translation selected from the group consisting of an address translation and a global title translation on the respective TCAP message received.

41. A method for exchanging encapsulated TCAP messages with an internet protocol network such that TCAP messages can therethrough be exchanged with a public telephone network, said method comprising the steps of:

receiving a TCAP message encapsulated in an IP protocol format from the internet protocol network, wherein the TCAP message originated in the public telephone network;

extracting the TCAP message and the associated addressing and routing information from the encapsulated TCAP message received; and processing the TCAP message originating in the public telephone network and received by the IP network entity.

42. The method according to claim 41, further comprising the steps of:

encapsulating a TCAP message in the IP protocol format from the internet protocol network, wherein the TCAP message originated in the IP network entity; and transmitting the TCAP message through the internet protocol network to an SS7 network entity in the public telephone network.

43. The method according to claim 42, further comprising the step of interacting with the internet protocol network through a STIPP protocol stack in the IP protocol format.

* * * * *